US010005500B2

(12) United States Patent
Huenemann et al.

(10) Patent No.: US 10,005,500 B2
(45) Date of Patent: Jun. 26, 2018

(54) OPERATOR STATION FOR AN AUTONOMOUS WORK VEHICLE

(71) Applicant: CNH Industrial America LLC, New Holland, PA (US)

(72) Inventors: Matthew Huenemann, Racine, WI (US); Christopher Alan Foster, Mohnton, PA (US); John Bradley Lukac, St. John, IN (US); Eric Michael Jacobsthal, Elmhurst, IL (US); Frank Zsigmond Asztalos, Orchard Lake, MI (US); Dwayne St. George Jackson, Plainfield, IL (US)

(73) Assignee: CNH Idustrial America LLC, New Holland, PA (US)

( * ) Notice: Subject to any disclaimer, the term of this patent is extended or adjusted under 35 U.S.C. 154(b) by 0 days. days.

(21) Appl. No.: 15/179,539

(22) Filed: Jun. 10, 2016

(65) Prior Publication Data

US 2017/0355402 A1    Dec. 14, 2017

(51) Int. Cl.
| | |
|---|---|
| *B62D 25/10* | (2006.01) |
| *B62D 33/06* | (2006.01) |
| *B60N 2/04* | (2006.01) |
| *B62D 1/04* | (2006.01) |
| *G05D 1/00* | (2006.01) |
| *B62D 1/02* | (2006.01) |
| *B60K 26/02* | (2006.01) |

(52) U.S. Cl.
CPC .......... *B62D 33/0617* (2013.01); *B60K 26/02* (2013.01); *B60N 2/04* (2013.01); *B62D 1/02* (2013.01); *B62D 1/04* (2013.01); *G05D 1/0088* (2013.01)

(58) Field of Classification Search
CPC ........ B62D 1/04; B62D 33/0617; B60N 2/04; G05D 1/0088
USPC ..................................................... 296/190.04
See application file for complete search history.

(56) References Cited

U.S. PATENT DOCUMENTS

| | | | |
|---|---|---|---|
| 7,156,446 B2* | 1/2007 | Perakis .................... | B60J 1/183 |
| | | | 280/756 |
| 7,967,365 B2* | 6/2011 | Gerhardt .................. | B60J 7/026 |
| | | | 280/756 |
| 9,259,984 B2* | 2/2016 | Brown ...................... | B60F 5/02 |

(Continued)

FOREIGN PATENT DOCUMENTS

| | | |
|---|---|---|
| EP | 1967931 | 9/2008 |
| JP | 2006044620 | 2/2006 |

(Continued)

OTHER PUBLICATIONS

PCT Application No. PCT/US2017/036844, International Search Report and Written Opinion dated Jan. 3, 2018, 10 pgs.

*Primary Examiner* — Pinel E Romain
(74) *Attorney, Agent, or Firm* — Rebecca L. Henkel; Rickard K. DeMille

(57) ABSTRACT

A work vehicle includes a body. The vehicle includes a panel configured to cover a portion of the body of the vehicle. The vehicle includes an operator station configured to be stowed within the body of the vehicle to enable the panel to cover the operator station while the vehicle is at least partially autonomously controlled. The operator station is configured to be deployed at least partially external to the body of the vehicle to enable an operator to control the vehicle.

16 Claims, 6 Drawing Sheets

(56) References Cited

U.S. PATENT DOCUMENTS

| | | | | |
|---|---|---|---|---|
| 2009/0320713 | A1* | 12/2009 | Amiri | B61B 13/00 |
| | | | | 104/281 |
| 2012/0193153 | A1* | 8/2012 | Wellborn | B62D 59/04 |
| | | | | 180/14.2 |
| 2015/0375865 | A1* | 12/2015 | Fischer | B64D 11/0639 |
| | | | | 701/49 |
| 2016/0347348 | A1* | 12/2016 | Lubischer | B62D 1/181 |
| 2017/0113641 | A1* | 4/2017 | Thieberger | B60R 1/00 |

FOREIGN PATENT DOCUMENTS

| | | | |
|---|---|---|---|
| JP | 2006048614 | 2/2006 | |
| WO | WO 2015012031 A1 * | 1/2015 | B60Q 1/0035 |

* cited by examiner

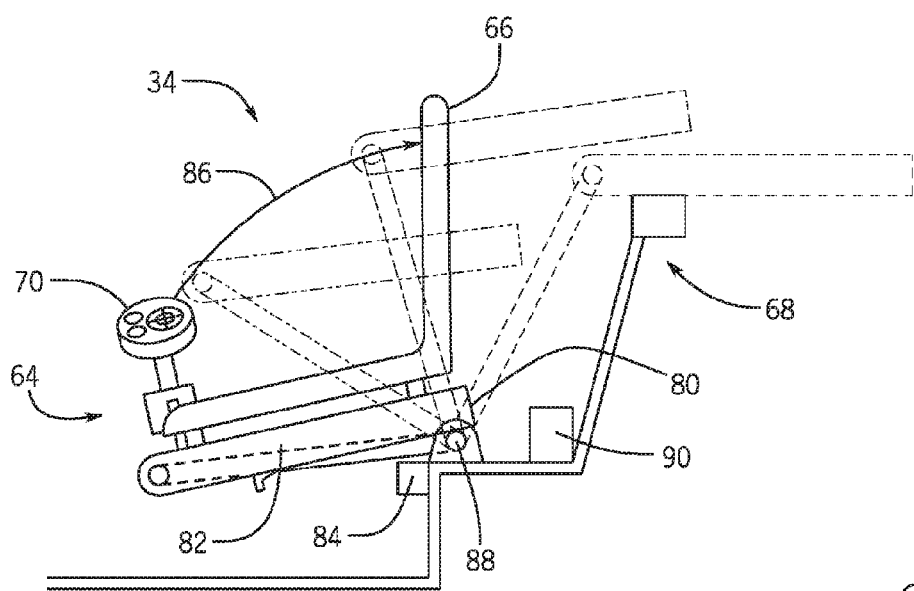
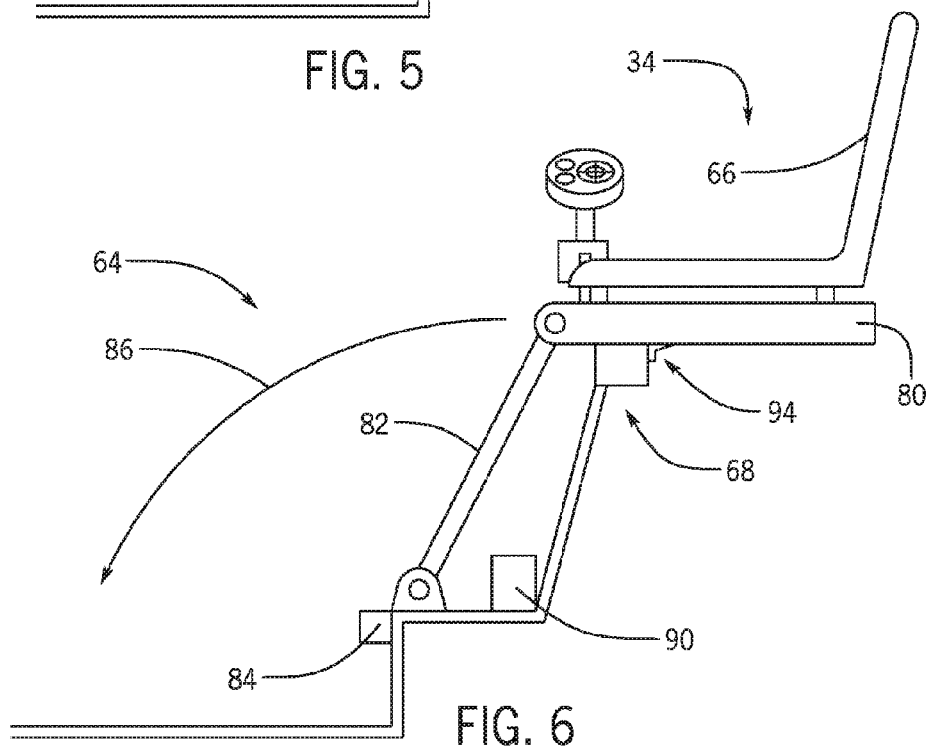

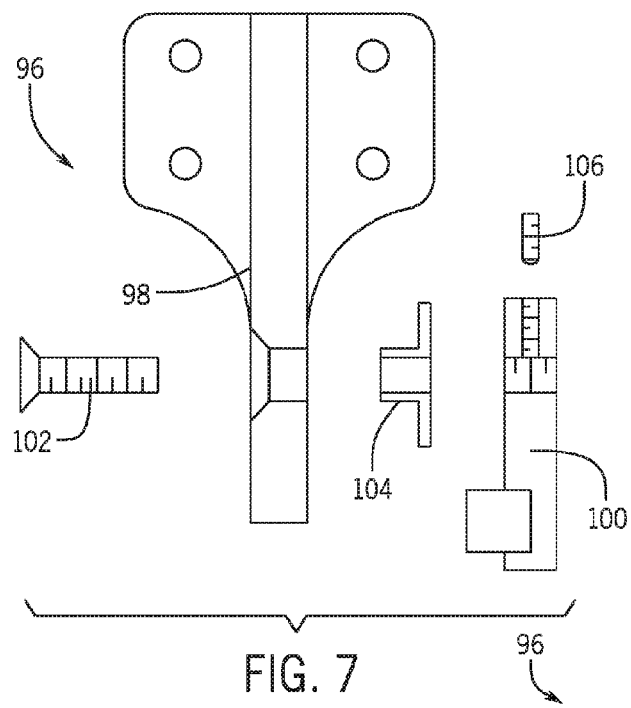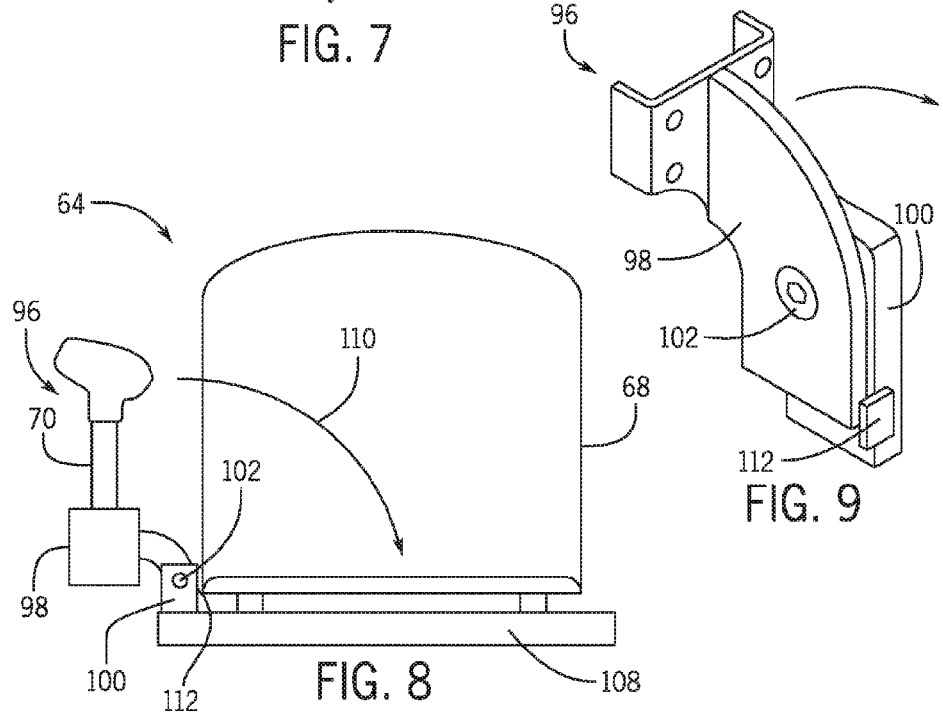

OPERATOR STATION FOR AN AUTONOMOUS WORK VEHICLE

BACKGROUND

The present disclosure relates generally to work vehicles, such as those used in agricultural operations and, more specifically, to an operation station for an autonomous work vehicle.

In recent years, work vehicles, such as agricultural tractors, have been designed to operate at least partially autonomously (e.g., without input from a vehicle occupant) to perform various operations, such as on fields of crops. For example, a controller may instruct a steering control system and/or a speed control system of the vehicle to automatically or semi-automatically guide the vehicle within a field. However, an operator may perform certain operations in a more efficient manner than autonomous vehicles.

BRIEF DESCRIPTION

In one embodiment, a work vehicle includes a body, a panel configured to cover a portion of the body of the vehicle, and an operator station configured to be stowed within the body of the vehicle to enable the panel to cover the operator station while the vehicle is at least partially autonomously controlled, and wherein the operator station is configured to be deployed at least partially external to the body of the vehicle to enable an operator to control the vehicle.

In another embodiment, a vehicle includes a body and an operator station comprising a deployable seat, wherein the deployable seat is configured to be stowed in a stowed position within the body and to be deployed to a manual operation position at least partially external to the body to enable an operator to control the vehicle from the deployable seat.

In a further embodiment, a vehicle includes a body, a panel configured to cover at least a portion of the body, and an operator station comprising a fixture, a steering wheel mount, and a steering wheel, wherein the steering wheel is configured to be selectively coupled to the fixture to stow the steering wheel within the body while the vehicle is at least partially autonomously controlled, and the steering wheel is configured to be selectively coupled to the steering wheel mount to enable manual operation of the vehicle.

DRAWINGS

These and other features, aspects, and advantages of the present disclosure will become better understood when the following detailed description is read with reference to the accompanying drawings in which like characters represent like parts throughout the drawings, wherein:

FIG. 5 is a side view of an embodiment of the operator station of FIG. 1 having a deployable seat system in the stowed position;

FIG. 6 is a side view of an embodiment of the operator station of FIG. 1 having the deployable seat system in the manual operation position;

FIG. 7 is an exploded front view of an embodiment of a control handle system of the operator station of FIG. 1;

FIG. 8 is a front view of an embodiment of the deployable seat system of the operator station of FIG. 1 having the control handle system;

FIG. 9 is a perspective view of an embodiment of the deployable seat system of the operator station of FIG. 1.

DETAILED DESCRIPTION

Figure 1:
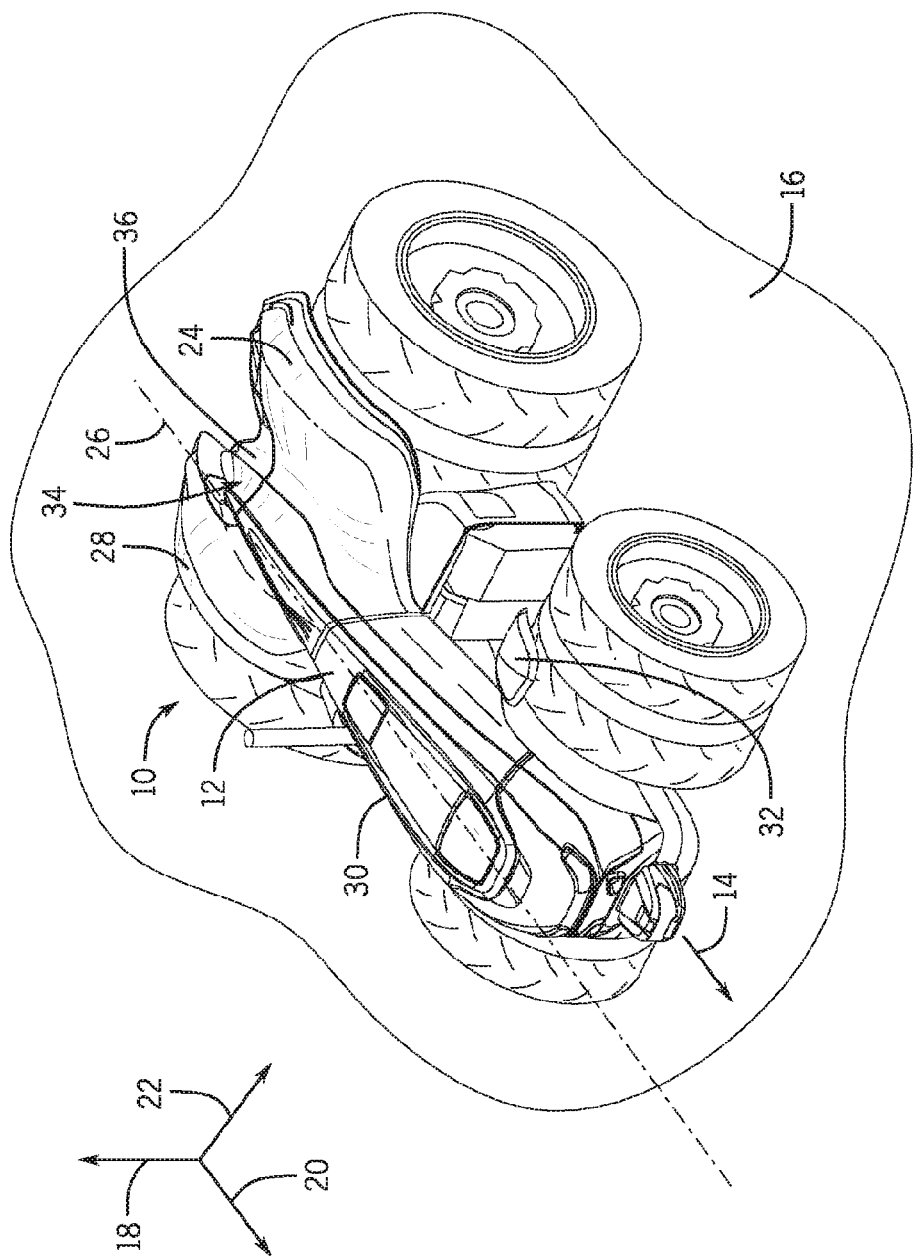
FIG. 1 is a perspective view of an embodiment of a work vehicle that includes an operator station within a body of the vehicle covered by a cover.

Turning now to the drawings, FIG. 1 is a perspective view of an embodiment of a work vehicle 10 that includes an operator station within a body 12 of the vehicle 10. The vehicle 10 includes a control system configured to automatically (e.g., autonomously) guide the vehicle 10, such as through a field (e.g., along a direction of travel 14) to facilitate operations (e.g., planting operations, seeding operations, application operations, tillage operations, harvesting operations, etc.). For example, the control system may automatically guide the vehicle 10 along a guidance swath through the field without input from an operator. The control system may also automatically guide the vehicle 10 around headland turns between segments of the guidance swath. To facilitate control of the vehicle 10, the control system includes a spatial locating device, such as a Global Position System (GPS) receiver, which is configured to output position information to a controller of the control system. Further, the vehicle 10 may include an inertial measurement unit (IMU) for terrain compensation (e.g., through Kalman Filters) and/or to correct vehicle position for GPS antenna motions caused by vehicle pitch and roll. I would recommend adding wording about the use of IMU's in determining vehicle position as well. The spatial locating device is configured to determine the position and/or orientation of the autonomous vehicle based on the spatial locating signals.

It should be noted that the techniques disclosed may be used on any desired type of vehicle, but are particularly useful for work vehicles. More particularly, one presently contemplated application is in the area of agricultural work operations, such as on farms, in fields, in operations entailed in preparing, cultivating, harvesting and working plants and fields, and so forth. While in the present disclosure reference may be made to the vehicle 10 as an "agricultural vehicle", it should be borne in mind that this is only one particular area of applicability of the technology, and the disclosure should not be understood as limiting it to such applications.

In the illustrated embodiment, the spatial locating antenna(s) are positioned beneath the body 12 of the agricultural vehicle 10. Accordingly, each spatial locating antenna is positioned below a top side of the body 12 relative to a ground surface 16 along a vertical axis 18. In certain embodiments, the top side of the body 12 extends beyond a longitudinal extent of each spatial locating antenna (e.g., an extent of the spatial locating antenna along a longitudinal axis 20) and a lateral extent of the spatial locating antenna (e.g., an extent of the spatial locating antenna along a lateral axis 22). As a result, the top surface of the body 12 completely covers each spatial locating antenna. Accordingly, the body 12 is formed from a material (e.g., fiberglass, a polymeric material, etc.) that facilitates passage of the spatial locating signal (e.g., a GPS signal of about 1 GHz to about 2 GHz) through the body 12 to each spatial locating antenna. Positioning the spatial locating antenna(s) beneath the body 12 may enhance the appearance of the agricultural vehicle 10 and/or protect the spatial locating antenna(s) from dirt/debris within the agricultural field.

In certain embodiments, a coating is disposed on an outer surface of the top side of the body 12. Certain coatings, such as metallic paints and/or paints containing carbon may interfere with (e.g., at least partially block) the spatial locating signals. Accordingly, to facilitate passage of the spatial locating signals through the body 12 to each spatial locating antenna, the coating includes gap(s) aligned with the respective spatial locating antenna(s). In certain embodiments, a second coating is disposed on the outer surface of the top side of the body 12 within the gap to enhance the appearance of the agricultural vehicle 10. The second coating is configured to facilitate passage of the spatial locating signals to the spatial locating antenna(s). For example, the second coating may include a non-metallic paint and/or a paint having a low carbon concentration (e.g., less than 10 percent, less than 5 percent, less than 1 percent, etc.). Alternatively, the second coating may include a decal (e.g., a vinyl decal) disposed on the outer surface of the of the top side of the body 12 within the gap.

In certain embodiments, at least one spatial locating antenna is positioned beneath at least one fender of the body 12. In the illustrated embodiment, the body 12 includes a first rear fender 24 on a first lateral side of a longitudinal centerline 26 (e.g., along the lateral axis 22) of the agricultural vehicle 10. The body 12 also includes a second rear fender 28 on a second lateral side of the longitudinal centerline 26 (e.g., along the lateral axis 22), opposite the first lateral side. As illustrated, each rear fender is positioned over a respective wheel, which is configured to engage the ground surface 16. While each rear fender 24 and 28 is positioned over a single wheel, it should be appreciated that in alternative embodiments, one or more rear fenders may be positioned over two or more wheels. In addition, if the agricultural vehicle 10 includes tracks, the rear fenders 24 and 28 may be positioned over the tracks. In certain embodiments, the control system includes a first spatial locating antenna positioned beneath the first rear fender 24 and a second spatial locating antenna positioned beneath the second rear fender 28. Positioning the spatial locating antennas beneath the rear fenders enables each spatial locating antenna to be positioned a significant distance from the longitudinal centerline 26, thereby increasing the accuracy of orientation determined by the spatial locating receiver and/or the controller. In certain embodiments, at least one spatial locating antenna may be positioned beneath the hood 30 and/or the front fender(s) 32 of the agricultural vehicle 10 (e.g., in addition to the rear fenders or instead of the rear fenders).

As described in detail below, the agricultural vehicle 10 includes a stowable operator station 34 that is stored within the body 12 under a cover or panel 36 of the agricultural vehicle 10 (e.g., between the first rear fender 24 and the second rear fender 28). In the illustrated embodiment, the cover or panel 36 may be fastened to the body 12 via one or more fasteners. As will be appreciated, the cover or panel 36 may be coupled to the body 12 using any suitable method. For example, the cover or panel 36 may include protrusions that match corresponding recesses of the body 12. Further, the cover or panel 36 may be removable or the cover or panel 36 may include a hinge.

Figure 2:
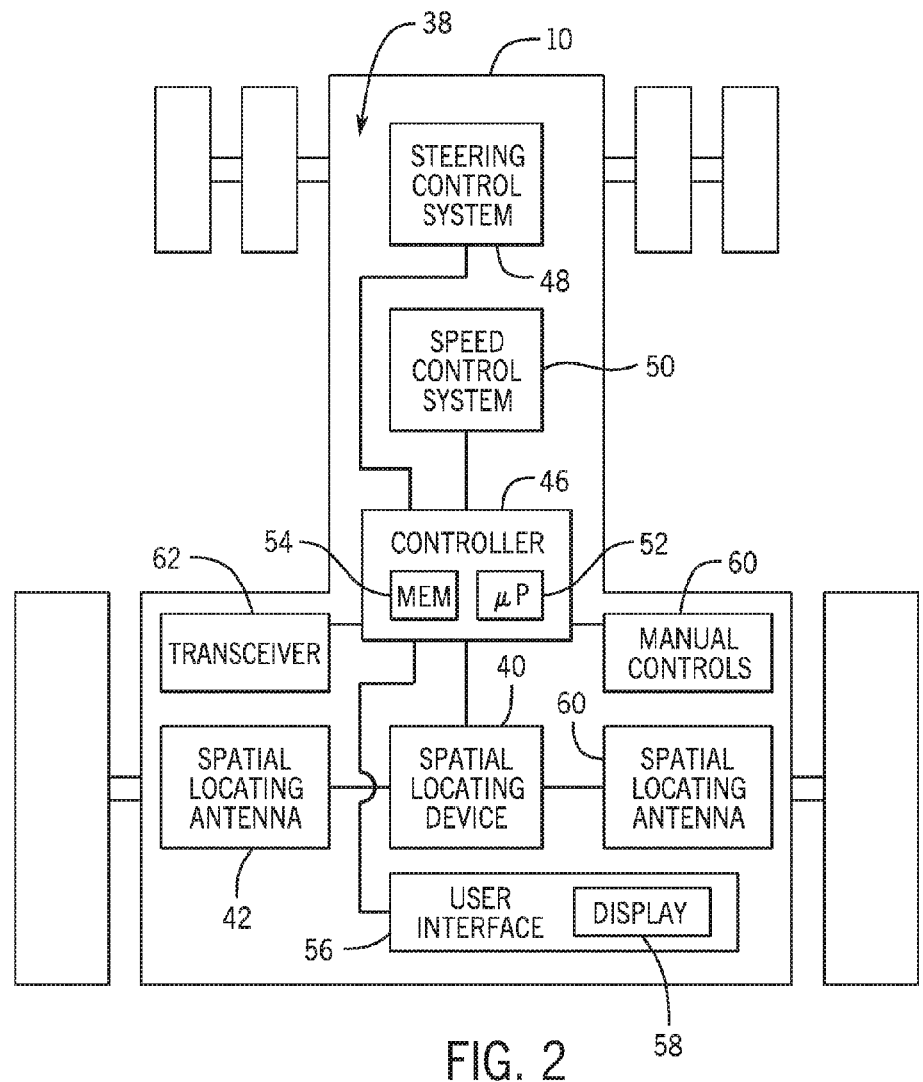
FIG. 2 is a schematic diagram of an embodiment of a control system that may be employed within the vehicle of FIG. 1.

FIG. 2 is a schematic diagram of an embodiment of a control system 38 that may be employed within the agricultural vehicle 10 of FIG. 1. In the illustrated embodiment, the control system 38 includes a spatial locating device 40, which is mounted to the agricultural vehicle 10 and configured to determine a position, and in certain embodiments a velocity, of the agricultural vehicle 10. As will be appreciated, the spatial locating device 40 may include any suitable system configured to measure and/or determine the position of the agricultural vehicle 10, such as a GPS receiver, for example.

In the illustrated embodiment, the control system 38 also includes a first spatial locating antenna 42 and a second spatial locating antenna 44 communicatively coupled to the spatial locating device 40. Each spatial locating antenna is configured to receive spatial locating signals (e.g., GPS signals from GPS satellites) and to output corresponding spatial locating data to the spatial locating device 40. As discussed in detail below, the spatial locating antennas 42 and 44 are positioned on opposite lateral sides of the longitudinal centerline. The spatial locating device 40 is configured to determine the position of each spatial locating antenna (e.g., based on the spatial locating signals). The spatial locating device 40 and/or a controller 46 of the control system 38 is configured to determine the orientation of the agricultural vehicle 10 based at least in part on the position of each spatial locating antenna. Increasing the lateral separation distance between the spatial locating antennas may increase the accuracy of orientation determination. Accordingly, in certain embodiments, the spatial locating antennas are positioned beneath rear fenders of the agricultural vehicle 10 to increase the lateral separation distance between the spatial locating antennas. While the illustrated control system 38 includes two spatial locating antennas, it should be appreciated that in alternative embodiments, the control system may include more or fewer spatial locating antennas (e.g., 1, 2, 3, 4, 5, 6, or more).

In certain embodiments, the control system may also include an inertial measurement unit (IMU) communicatively coupled to the controller and configured to enhance the accuracy of the determined position and/or orientation. For example, the IMU may include one or more accelerometers configured to output signal(s) indicative of acceleration along the longitudinal axis, the lateral axis, the vertical axis, or a combination thereof. In addition, the IMU may include one or more gyroscopes configured to output signal(s) indicative of rotation (e.g., rotational angle, rotational velocity, rotational acceleration, etc.) about the longitudinal axis, the lateral axis, the vertical axis, or a combination thereof. The controller may determine the position and/or orientation of the agricultural vehicle based on the IMU signal(s) while the spatial locating signals received by the spatial locating antennas are insufficient to facilitate position determination (e.g., while an obstruction, such as a tree or building, blocks the spatial locating signals from reaching the spatial locating antennas). In addition, the controller may utilize the IMU signal(s) to enhance the accuracy of the determined position and/or orientation. For example, the controller may combine the IMU signal(s) with the spatial locating data and/or the position determined by the spatial locating device (e.g., via Kalman filtering, least squares fitting, etc.) to determine a more accurate position and/or orientation of the agricultural vehicle (e.g., by compensating for movement of the spatial locating antennas resulting from pitch and/or roll of the agricultural vehicle as the agricultural vehicle traverses uneven terrain).

In certain embodiments, the IMU and the spatial locating device may be disposed within a common housing. In further embodiments, the IMU and one spatial locating antenna may be disposed within a common housing. For example, each spatial locating antenna housing may include a spatial locating antenna and an IMU. Furthermore, in certain embodiments, a portion of the spatial locating device and one spatial locating antenna may be disposed within a common housing. For example, a first portion of the spatial locating device and the first spatial locating antenna may be disposed within a first housing, and a second portion of the spatial locating device and the second spatial locating antenna may be disposed within a second housing. In certain embodiments, a first IMU may be disposed within the first housing, and a second IMU may be disposed within the second housing.

In the illustrated embodiment, the control system 38 includes a steering control system 48 configured to control a direction of movement of the agricultural vehicle 10, and a speed control system 50 configured to control a speed of the agricultural vehicle 10. In addition, the control system 38 includes the controller 46, which is communicatively coupled to the spatial locating device 40, to the steering control system 48, and to the speed control system 50. The controller 46 is configured to automatically control the agricultural vehicle 10 during certain phases of agricultural operations (e.g., without operator input, with limited operator input, etc.).

In certain embodiments, the controller 46 is an electronic controller having electrical circuitry configured to process data from the spatial locating device 40 and/or other components of the control system 38. In the illustrated embodiment, the controller 46 include a processor 52, such as the illustrated microprocessor, and a memory device 54. The controller 46 may also include one or more storage devices and/or other suitable components. The processor 52 may be used to execute software, such as software for controlling the agricultural vehicle 10, software for determining vehicle orientation, and so forth. Moreover, the processor 52 may include multiple microprocessors, one or more "general-purpose" microprocessors, one or more special-purpose microprocessors, and/or one or more application specific integrated circuits (ASICS), or some combination thereof. For example, the processor 52 may include one or more reduced instruction set (RISC) processors.

The memory device 54 may include a volatile memory, such as random access memory (RAM), and/or a nonvolatile memory, such as read-only memory (ROM). The memory device 54 may store a variety of information and may be used for various purposes. For example, the memory device 54 may store processor-executable instructions (e.g., firmware or software) for the processor 52 to execute, such as instructions for controlling the agricultural vehicle 10, instructions for determining vehicle orientation, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., sensor data, position data, vehicle geometry data, etc.), instructions (e.g., software or firmware for controlling the agricultural vehicle 10, etc.), and any other suitable data.

In certain embodiments, the steering control system 48 may include a wheel angle control system, a differential braking system, a torque vectoring system, or a combination thereof. The wheel angle control system may automatically rotate one or more wheels and/or tracks of the agricultural vehicle 10 (e.g., via hydraulic actuators) to steer the agricultural vehicle 10 along a desired route (e.g., along the guidance swath, along the swath acquisition path, etc.). By way of example, the wheel angle control system may rotate front wheels/tracks, rear wheels/tracks, and/or intermediate wheels/tracks of the agricultural vehicle 10, either individually or in groups. The differential braking system may independently vary the braking force on each lateral side of the agricultural vehicle 10 to direct the agricultural vehicle 10 along a path. Similarly, the torque vectoring system may differentially apply torque from an engine to wheels and/or tracks on each lateral side of the agricultural vehicle 10, thereby directing the agricultural vehicle 10 along a path. In further embodiments, the steering control system 48 may include other and/or additional systems to facilitate directing the agricultural vehicle 10 along a path through the field.

In certain embodiments, the speed control system 50 may include an engine output control system, a transmission control system, a braking control system, or a combination thereof. The engine output control system may vary the output of the engine to control the speed of the agricultural vehicle 10. For example, the engine output control system may vary a throttle setting of the engine, a fuel/air mixture of the engine, a timing of the engine, other suitable engine parameters to control engine output, or a combination thereof. In addition, the transmission control system may adjust an input-output ratio within a transmission to control the speed of the autonomous agricultural vehicle 10. Furthermore, the braking control system may adjust braking force, thereby controlling the speed of the autonomous agricultural vehicle 10. In further embodiments, the speed control system may include other and/or additional systems to facilitate adjusting the speed of the autonomous agricultural vehicle 10.

In certain embodiments, the control system 38 may also control operation of an agricultural implement coupled to the autonomous agricultural vehicle 10. For example, the control system 38 may include an implement control system/implement controller configured to control a steering angle of the implement (e.g., via an implement steering control system having a wheel angle control system and/or a differential braking system) and/or a speed of the autonomous agricultural vehicle/implement system (e.g., via an implement speed control system having a braking control system). In such embodiments, the control system 38 may be communicatively coupled to a control system/controller on the implement via a communication network, such as a controller area network (CAN bus).

In the illustrated embodiment, the control system 38 includes a user interface 56 communicatively coupled to the controller 46. The user interface 56 is configured to enable an operator (e.g., standing proximate to the autonomous agricultural vehicle 10) to control certain parameters associated with operation of the autonomous agricultural vehicle 10. For example, the user interface 56 may include a switch that enables the operator to configure the autonomous agricultural vehicle 10 for autonomous or manual operation. In addition, the user interface 56 may include a battery cut-off switch, an engine ignition switch, a stop button, or a combination thereof, among other controls. In certain embodiments, the user interface 56 includes a display 58 configured to present information to the operator, such as a graphical representation of a guidance swath, a visual representation of certain parameter(s) associated with operation of the autonomous agricultural vehicle 10 (e.g., fuel level, oil pressure, water temperature, etc.), a visual representation of certain parameter(s) associated with operation of an implement coupled to the autonomous agricultural vehicle 10 (e.g., seed level, penetration depth of ground engaging tools, orientation(s)/position(s) of certain components of the implement, etc.), or a combination thereof, among other information. In certain embodiments, the display 58 may include a touch screen interface that enables the operator to control certain parameters associated with operation of the autonomous agricultural vehicle 10 and/or the implement.

In the illustrated embodiment, the control system 38 includes manual controls 60 configured to enable an operator to control the autonomous agricultural vehicle 10 while automatic control is disengaged (e.g., while unloading the autonomous agricultural vehicle from a trailer, etc.). The manual controls 60 may include manual steering control, manual transmission control, manual braking control, or a combination thereof, among other controls. In the illustrated embodiment, the manual controls 60 are communicatively coupled to the controller 46. The controller 46 is configured to disengage automatic control of the autonomous agricultural vehicle 10 upon receiving a signal indicative of manual control of the autonomous agricultural vehicle 10. Accordingly, if an operator controls the autonomous agricultural vehicle 10 manually, the automatic control terminates, thereby enabling the operator to control the autonomous agricultural vehicle 10.

In the illustrated embodiment, the control system 38 includes a transceiver 62 communicatively coupled to the controller 46. In certain embodiments, the transceiver 62 is configured to establish a communication link with a corresponding transceiver of a base station, thereby facilitating communication between the base station and the control system of the autonomous agricultural vehicle 10. For example, the base station may include a user interface that enables a remote operator to provide instructions to the control system 38 (e.g., instructions to initiate automatic control of the autonomous agricultural vehicle, instructions to direct the autonomous agricultural vehicle along a path, etc.). The user interface may also enable a remote operator to provide data to the control system. The transceiver 62 may operate at any suitable frequency range within the electromagnetic spectrum. For example, in certain embodiments, the transceiver 62 may broadcast and receive radio waves within a frequency range of about 1 GHz to about 10 GHz. In addition, the transceiver 62 may utilize any suitable communication protocol, such as a standard protocol (e.g., Wi-Fi, Bluetooth, etc.) or a proprietary protocol.

The agricultural vehicle 10 may perform certain operations autonomously (e.g., without an operator on the agricultural vehicle) or partially autonomously (e.g., with instructions from an operator remote from the agricultural vehicle, with instructions from the control system, etc.) more efficiently than an operator. Moreover, a permanent cab may take up significant space within the autonomous vehicle 10, which the operator may not desire for certain operations. Further, the operator may perform certain operations in a more efficient manner than the control system 38. For example, the operator may be more efficient at coupling an implement, loading the agricultural vehicle onto a truck, or a particular implement may not be set up for autonomous operation, among others. As such, it may be desirable to include an operator station that reduces or eliminates interference with autonomous operations as well as reduces space utilized while the agricultural vehicle 10 operates autonomously or partially autonomously, but provides manual controls for an operator when the agricultural vehicle 10 is operated by the operator.

In certain embodiments, the control system may include other and/or additional controllers/control systems, such as the implement controller/control system discussed above. For example, the implement controller/control system may be configured to control various parameters of an agricultural implement towed by the agricultural vehicle. In certain embodiments, the implement controller/control system may be configured to instruct actuator(s) to adjust a penetration depth of at least one ground engaging tool of the agricultural implement. By way of example, the implement controller/control system may instruct actuator(s) to reduce or increase the penetration depth of each tillage point on a tilling implement, or the implement controller/control system may instruct actuator(s) to engage or disengage each opener disc/blade of a seeding/planting implement from the soil. Furthermore, the implement controller/control system may instruct actuator(s) to transition the agricultural implement between a working position and a transport portion, to adjust a flow rate of product from the agricultural implement, or to adjust a position of a header of the agricultural implement (e.g., a harvester, etc.), among other operations. The agricultural vehicle control system may also include controller(s)/control system(s) for electrohydraulic remote(s), power take-off shaft(s), adjustable hitch(es), or a combination thereof, among other controllers/control systems.

Figure 3:
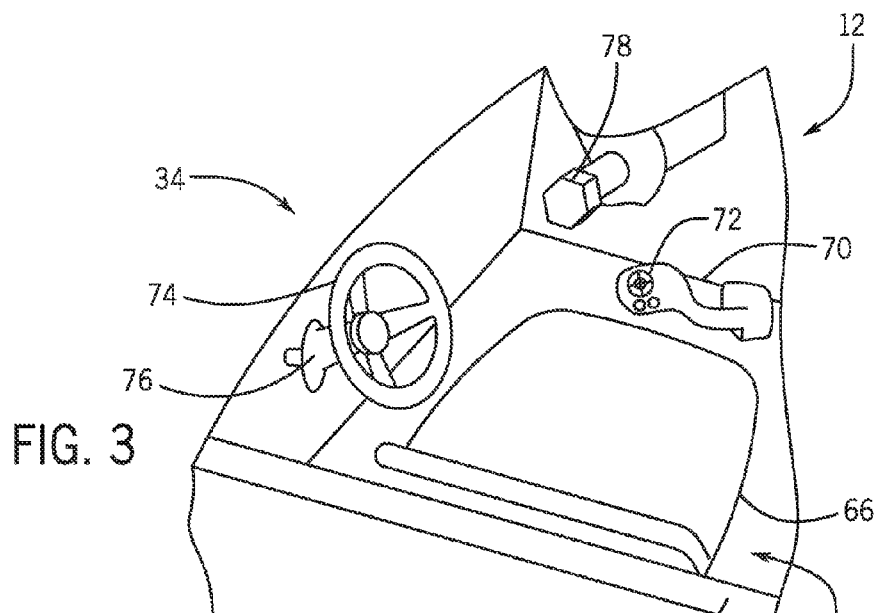
FIG. 3 is a perspective view of the vehicle having the cover of FIG. 1 removed with parts of the operator station in stowed positions.
Figure 4:
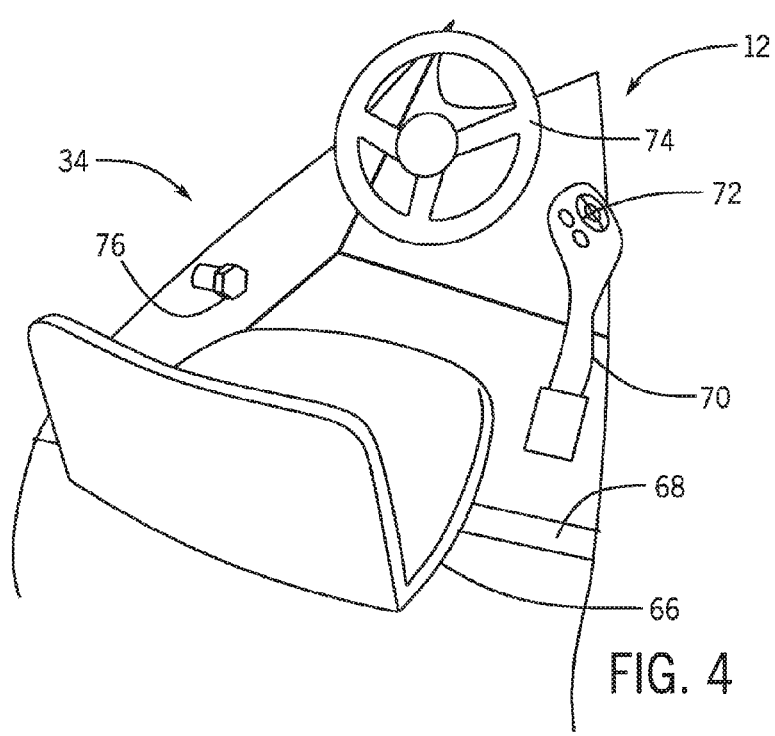
FIG. 4 is a perspective view of an embodiment of the vehicle having the cover of FIG. 1 removed with parts of the operator station in manual operation positions.
Figure 10:
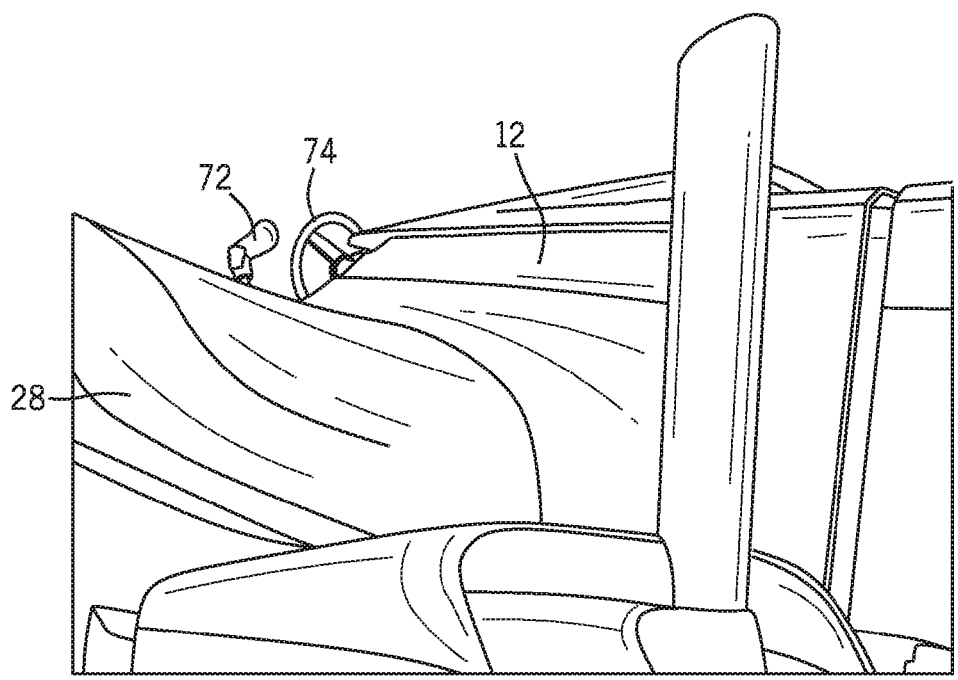
FIG. 10 is a perspective view of the body of the agricultural vehicle looking toward the operator station, showing the steering wheel and the control handle system extending at least partially above the body.

FIG. 3 is a perspective view of the agricultural vehicle 10 having the cover or panel 36 of FIG. 1 removed with parts of the operator station 34 in stowed positions (e.g., within the body of the agricultural vehicle 10). The operator station 34 may include an opening for the operator station 34 that matches a contour of the cover or panel 36 to be covered while the agricultural vehicle operates autonomously or partially autonomously. Further, one or more parts of the operator station 34 may be deployed (e.g., extends beyond the contour where the cover or panel 36 would be located if the cover or panel 36 were not removed). For example, the operator station 34 includes a deployable seat system 64 having a deployable seat 66 in a stowed position (e.g., lowered position) to enable the cover or panel to enclose (e.g., stow) the operator station 34 within the body 12 of the agricultural vehicle. That is, the deployable seat 66 may be positioned within a portion of the agricultural vehicle structure 68. The operator station 34 includes a control handle 70 having one or more controls 72 to control operation of the agricultural vehicle, as shown in FIGS. 3, 4 and 10. The control handle 70 may have controls 72 that control one or more electrohydraulic valves of the agricultural vehicle. Further, the control handle 70 may be configured to be stowed on the seat pan in a stowed position (e.g., lowered and/or parallel to the ground surface 16) to provide clearance to enable the cover or panel to enclose the operator station 34 and to reduce the space utilized by the operator station 34.

In the illustrated embodiment, the operator station 34 includes a steering wheel 74 mounted to a fixture 76 in a stowed position (e.g., lowered position) that secures the steering wheel 76 within the operator station 34 to provide clearance that enable the cover or panel 36 to enclose the operator station 34 (e.g., while the agricultural vehicle is in autonomous operation). That is, the steering wheel 74 may be mounted to the fixture 76 in the stowed position (e.g., lower than a steering position) to reduce the space utilized by the operator station 34. As such, the deployable seat 66, the control handle 70, and the steering wheel 74 are shown in the stowed position to enable the cover or panel 36 to enclose the operator station 34 to reduce the space utilized by the operator station 34, thereby reducing or eliminating interference with autonomous operations. While deploying the parts of the operator station 34 to enable manual operation, the operator may mount the steering wheel 74 to the steering mount 78, as illustrated in FIGS. 4 and 10. While the illustrated embodiment includes certain parts of the operator station 34, the operator station 34 may include any suitable parts (e.g., pedals, manual controls, etc.) to enable an operator to manually control the agricultural vehicle.

FIG. 4 is a perspective view of the agricultural vehicle having the cover of FIG. 1 removed from the body 12 with parts of the operator station 34 in manual operation positions. The deployable seat 66 may be moved from the stowed position within the portion of the agricultural vehicle structure 68 to the manual operation position onto the agricultural vehicle structure 68 to provide space for the operator to sit in the deployable seat 66 to operate the agricultural vehicle. In the illustrated embodiment, the steering wheel 74 is removed from the fixture 76 and mounted to the steering mount in a manual operation position that enables the operator to steer the agricultural vehicle. Moreover, the control handle 70 may be rotated with respect to the agricultural vehicle to a manual operation position (e.g., substantially vertical with respect to the ground surface) to position the manual controls 72 such that the operator may control the agricultural vehicle.

FIG. 5 is a side view of the operator station 34 having the deployable seat system 64 in the stowed position (e.g., lowered position) in which a first link 80 and a second link 82 are folded with respect to each other. The link may be made of steel or any other suitable material. The first link 80 and the second link 82 are folded onto a stowed position stop bracket 84 that secures the deployable seat 66 into place while performing autonomous operations. Further, in some embodiments, the control handle 70 may be disposed on the deployable seat system 64 (e.g., onto the first link 80) to move the control handle 70 into a position such that the operator may control the agricultural vehicle.

In the illustrated embodiment, the deployable seat 66 deploys from the stowed position to the manual operation position in which the deployable seat 66 is deployed for the operator. To move to the deployable seat 66 from the stowed position to the manual operation position, the deployable seat 66 travels in an arc 86 about a pivot 88 such that the deployable seat 66 is prevented from contacting the circuitry 90 disposed within the operator station 34. That is, the deployable seat 66 may be stowed within the structure 68 of the body 12 of the agricultural vehicle while the agricultural vehicle is at least partially autonomously controlled. Further, the deployable seat 66 is deployed at least partially external to the structure 68 of the body 12 of the agricultural vehicle to enable the operator to control the agricultural vehicle from the deployable seat 66.

FIG. 6 is a side view of the operator station 34 having the deployable seat system 64 in the manual operation position on a portion of the structure 68 of the agricultural vehicle. The deployable seat system 64 includes the first link 80 extended onto the position retaining tab 94 to secure the deployable seat 66 while the operator is manually operating the agricultural vehicle. The second link 82 is released from the stowed position stop bracket 84 and pivots between the pivot 88 and the first link 80. The operator station 34 may travel in the arc 86 about the pivot 88 to position the deployable seat 66 in the stowed position such that the deployable seat 66 is prevented from contacting the circuitry 90 disposed within the operation station 34.

FIG. 7 is an exploded front view of the control handle system 96 of the operator station having a handle bracket 98 that may be used to support the control handle of FIG. 3. The control handle may be fastened to a base 100 via a fastener 102 (e.g., bolt) and a bushing 104. The fastener 102 and bushing 104 may be secured via a set screw 106.

FIG. 8 is a front view of the deployable seat system 64 having the control handle system 96 secured to a base 108 of the deployable seat system 64. In the illustrated embodiment, the control handle 70 is in the manual operation position to enable the operator to control the agricultural vehicle. The control handle 70 may rotate around the axis 110 along the fastener 102 to be positioned in the stowed position. Further, the base 100 may include a stop tab 112 to block the control handle 70 while the control handle is in the stowed position.

FIG. 9 is a perspective view of an embodiment of the handle system of the operator station of FIG. 1. In the embodiment, the stop tab 112 stops the handle system 96 as the handle bracket 98 rotates about the fastener 102.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A work vehicle, comprising:
    a body;
    a panel configured to cover a portion of the body of the vehicle; and
    an operator station configured to be stowed within the body of the vehicle to enable the panel to cover the operator station while the vehicle is at least partially autonomously controlled, and wherein the operator station is configured to be deployed at least partially external to the body of the vehicle to enable an operator to control the vehicle,
    wherein the operator station comprises a deployable seat configured to be stowed in the stowed position within the body and to be deployed to a manual operation position at least partially external to the body.

2. The vehicle of claim 1, wherein the deployable seat is configured to travel along an arc between the stowed position and the manual operation position to prevent the deployable seat from contacting circuitry disposed within the operator station.

3. The vehicle of claim 1, wherein the operator station comprises a steering wheel configured to be mounted to a fixture within the body in a stowed position to store the steering wheel and to enable the panel to cover the operator station.

4. The vehicle of claim 3, wherein the steering wheel is configured to be mounted to a steering mount of the operator station that enables manual operation of the vehicle.

5. The vehicle of claim 1, wherein the operator station comprises a control handle configured to rotate from a stowed position parallel to a ground surface that the vehicle drives to a manual operation position generally orthogonal to the ground surface to enable manual control of the vehicle.

6. A work vehicle, comprising:
    a body; and
    an operator station comprising a deployable seat, wherein the deployable seat is configured to be stowed in a stowed position within the body and to be deployed to a manual operation position at least partially external to the body to enable an operator to control the vehicle from the deployable seat.

7. The vehicle of claim 6, wherein the deployable seat is coupled to a pivot of the body via a first link and a second link to secure the deployable seat to the vehicle.

8. The vehicle of claim 7, wherein the deployable seat is configured to travel along an arc between the stowed position and the manual operation position to prevent the deployable seat from contacting circuitry disposed within the operator station.

9. The vehicle of claim 7, wherein the first link and the second link are configured to fold with respect to each other to the stowed position to reduce space of the operator station while the vehicle is at least partially autonomously controlled.

10. The vehicle of claim 9, wherein the first link and the second link are configured to rotate to extend the deployable seat.

11. The vehicle of claim 6, wherein the operator station comprises a control handle configured to rotate from a position parallel to a ground surface driven by the vehicle to a position generally orthogonal to the ground surface to enable manual control of the vehicle.

12. The vehicle of claim 11, wherein the control handle comprises a stop tab to block movement of the control handle while the control handle is in the stowed position.

13. The vehicle of claim 11, wherein the control handle is mounted onto the deployable seat.

14. A work vehicle, comprising:
a body;
a panel configured to cover at least a portion of the body; and
an operator station comprising a fixture, a steering wheel mount, and a steering wheel, wherein the steering wheel is configured to be selectively coupled to the fixture to stow the steering wheel within the body while the vehicle is at least partially autonomously controlled, and the steering wheel is configured to be selectively coupled to the steering wheel mount to enable manual operation of the vehicle, wherein the fixture is configured to stow the steering wheel in a location lower than the location of the steering wheel mount to enable clearance of the panel to cover the portion of the body while the steering wheel is coupled to the fixture, wherein the operator station comprises a deployable seat configured to be stowed in the stowed position within the body and to be deployed to a manual operation position at least partially external to the body.

15. The vehicle of claim 14, wherein the steering wheel mount is positioned in a location proximate to a deployable seat.

16. The vehicle of claim 14, wherein the operator station comprises a control handle configured to rotate from a position parallel to a ground surface driven by the vehicle to a position generally orthogonal to the ground surface to enable manual control of the vehicle within the operator station.

* * * * *